(12) United States Patent
Bedner et al.

(10) Patent No.: US 7,756,620 B2
(45) Date of Patent: Jul. 13, 2010

(54) METHODS, SYSTEMS, AND COMPUTER PROGRAM PRODUCTS FOR TIRE SLIP ANGLE LIMITING IN A STEERING CONTROL SYSTEM

(75) Inventors: Edward J. Bedner, Brighton, MI (US); Chester W. Gryczan, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 772 days.

(21) Appl. No.: 11/556,769

(22) Filed: Nov. 6, 2006

(65) Prior Publication Data

US 2008/0109133 A1 May 8, 2008

(51) Int. Cl.
*B62D 5/04* (2006.01)
(52) U.S. Cl. .................. 701/41; 180/421; 180/443; 340/465
(58) Field of Classification Search ............ 701/71, 701/29, 38, 41, 42, 43; 180/422, 446, 421, 180/443; 303/146; 340/465; *B62D 5/04*
See application file for complete search history.

(56) References Cited

U.S. PATENT DOCUMENTS

| | | | |
|---|---|---|---|
| 6,212,461 B1 * | 4/2001 | Ghoneim et al. ............. 701/70 |
| 6,282,479 B1 * | 8/2001 | Ghoneim et al. ............. 701/70 |
| 6,662,898 B1 | 12/2003 | Mattson et al. | |
| 6,840,343 B2 | 1/2005 | Mattson et al. | |
| 2002/0198644 A1 * | 12/2002 | Obata et al. ............. 701/41 |
| 2005/0274560 A1 * | 12/2005 | Wakao et al. ............. 180/197 |
| 2006/0009894 A1 * | 1/2006 | Goto et al. ............. 701/41 |
| 2006/0025896 A1 * | 2/2006 | Traechtler et al. ............. 701/1 |
| 2006/0041365 A1 * | 2/2006 | Mori ............. 701/70 |
| 2006/0055237 A1 * | 3/2006 | Taniguchi et al. ............. 303/146 |
| 2006/0112573 A1 * | 6/2006 | Hillman et al. ............. 33/203 |
| 2006/0158031 A1 * | 7/2006 | Kummel et al. ............. 303/146 |
| 2006/0229782 A1 * | 10/2006 | Deng et al. ............. 701/42 |
| 2006/0259225 A1 * | 11/2006 | Ono et al. ............. 701/82 |
| 2007/0084276 A1 * | 4/2007 | Matsuda et al. ............. 73/146 |
| 2007/0162202 A1 * | 7/2007 | Moshchuk et al. ............. 701/38 |
| 2007/0240502 A1 * | 10/2007 | Morinaga et al. ............. 73/146 |
| 2008/0040000 A1 * | 2/2008 | Chen et al. ............. 701/38 |
| 2009/0236905 A1 * | 9/2009 | Maeda et al. ............. 303/146 |

* cited by examiner

*Primary Examiner*—Tuan C To
(74) *Attorney, Agent, or Firm*—Cantor Colburn LLP

(57) ABSTRACT

A method, system, and computer program product for tire slip angle limiting in a steering control system for a vehicle are provided. The method includes calculating a first steering augmentation angle from a vehicle speed and a handwheel angle. The method further includes calculating an upper bound angle limit and a lower bound angle limit as functions of a vehicle slip angle and a tire slip angle limit. The method also includes bounding the sum of the handwheel angle plus the first steering augmentation angle between the upper bound angle limit and the lower bound angle limit to produce a first bounded angle. The method additionally includes subtracting the sum of the handwheel angle plus the first steering augmentation angle from the first bounded angle to produce a first limiting function, and producing a motor angle command by adding the first limiting function plus the first steering augmentation angle.

20 Claims, 13 Drawing Sheets

METHODS, SYSTEMS, AND COMPUTER PROGRAM PRODUCTS FOR TIRE SLIP ANGLE LIMITING IN A STEERING CONTROL SYSTEM

FIELD OF THE INVENTION

This invention relates to active steering control, and more particularly, to methods, systems, and computer program products for tire slip angle limiting in a steering control system.

BACKGROUND

As a tire on a road wheel rotates, only a portion of the tire makes contact with a travel surface (e.g., a road). The portion of the tire that makes contact with the travel surface is often referred to as a tire contact patch. When a driver of a vehicle desires to turn the vehicle, the driver typically turns a handwheel to change the lateral travel direction of the vehicle, resulting in vehicle yaw. The vehicle's tires supply the necessary force to turn the vehicle, referred to as tire lateral force. Due to the elastic nature of a tire sidewall and friction between the tire contact patch and the travel surface, as the angle of the handwheel changes during a turn, there may be an angular difference between the direction of travel of the turning tire's contact patch and the direction of travel of the road wheel of winch the turning tire is a part, known as a tire slip angle.

In the past, electronically controlled steeling systems used control algorithms that did not fully comprehend the relationship between tire lateral force and tire slip angle (tire force-slip relationship). The tire force-slip relationship is typically a nonlinear function, where tire lateral force saturates at large positive and large negative tire slip angles. The tire force-slip relationship varies based on factors such as the coefficient of function between the tire contact patch and the travel surface, as well as other variables including particular tire and vehicle characteristics. Early steering control systems made no attempt to include the tire force-slip relationship in compensation algorithms. Such systems allowed for saturation of tire lateral force, resulting in reduced vehicle steering performance.

Other steering control systems have been contemplated that attempt to control tire slip angle based upon an assumed relationship where a peak or knee value appears near the saturation region of a tire force-slip curve. Such systems attempt to maintain the tire slip angle in a region between the peak and a maximum tire slip angle. These systems also attempt to change the peak and maximum tire slip angles based upon an estimated coefficient of friction of the travel surface. However, such systems fail to account for common conditions where there is no knee or peak in a tire force-slip curve, therefore limiting the usefulness of such systems to a narrow range of conditions.

Furthermore, such steering control systems also fail to account for the contributions from steering control system augmentation offsets, such as offsets produced by a stability control algorithm. When steering control system augmentation offsets are included in a limiting system, the order of limiting calculations is critically important. If a steering actuator is adjusted based on tire force-slip calculations alone, an over or under correction may result, as steering control system augmentation offsets are also added or subtracted from the steering angle. In failing to account for the effects of additional contributions from steering control system augmentation offsets, such steering control systems may allow tires to reach excessively large slip angles where lateral force is saturated.

Such steering control systems also require multiple sensors, which can drive up overall system cost substantially. Sensors required by such steering control systems may include one or more: yaw rate sensors, speed sensors, lateral acceleration sensors, roll rate sensors, steering angle sensors, longitudinal acceleration sensors, pitch rate sensors, and steering angle position sensors. The high cost that results from such systems may make the initial investment prohibitively expensive for manufacturers and consumers alike. Additionally, the large number of sensors, associated wiring, harnesses, and support assemblies may increase overall vehicle weight, yielding a reduction in vehicle fuel efficiency. Therefore, it would be beneficially to lessen the total number of required sensors for a steering control system, while accounting for the tire force-slip relationship.

The shortcomings of the aforementioned steering control systems may put drivers and passengers of vehicles at risk. Large tire slip angles may develop during emergency maneuvers on any travel surface and may also occur during moderate maneuvers on slippery travel surfaces. The resulting saturation of lateral forces from the large tire slip angles leads to a loss of vehicle response and excessive oversteer (i.e., spinout) or understeer (i.e., plowing) of the vehicle. Since the previous electronically controlled steering systems did not fully recognize the nonlinear force saturation characteristic of tires, the additional effects of steering control system augmentation offsets, and the potential variety in tire force-slip curves, they were unable to prevent excessive understeer or oversteer of the vehicle in situations when precise control was needed most.

Accordingly, there is a need for a method that overcomes these drawbacks and properly accounts for the nonlinear relationship between tire lateral force and tire slip angle to mitigate excessive understeer or oversteer of a vehicle.

SUMMARY

The shortcomings of the prior art are overcome and additional advantages are provided through the provision of methods, systems, and computer program products for tire slip angle limiting in a steering control system for a vehicle. The method includes calculating a first steering augmentation angle from a vehicle speed and a handwheel angle. The method further includes calculating an upper bound angle limit and a lower bound angle limit as functions of a vehicle slip angle and a tire slip angle limit. The method also includes bounding the sum of the handwheel angle plus the first steering augmentation angle between the upper bound angle limit and the lower bound angle limit to produce a first bounded angle. The method additionally includes subtracting the sum of the handwheel angle plus the first steering augmentation angle from the first bounded angle to produce a first limiting function, and producing a motor angle command by adding the first limiting function plus the first steering augmentation angle.

System and computer program products corresponding to the above-summarized methods are also described and claimed herein.

The above-described and other features will be appreciated and understood by those skilled in the art from the following detailed description, drawings, and appended claims.

BRIEF DESCRIPTION OF THE DRAWINGS

Referring now to the Figures wherein like elements are numbered alike.

DESCRIPTION OF PREFERRED EMBODIMENTS

Figure 1:
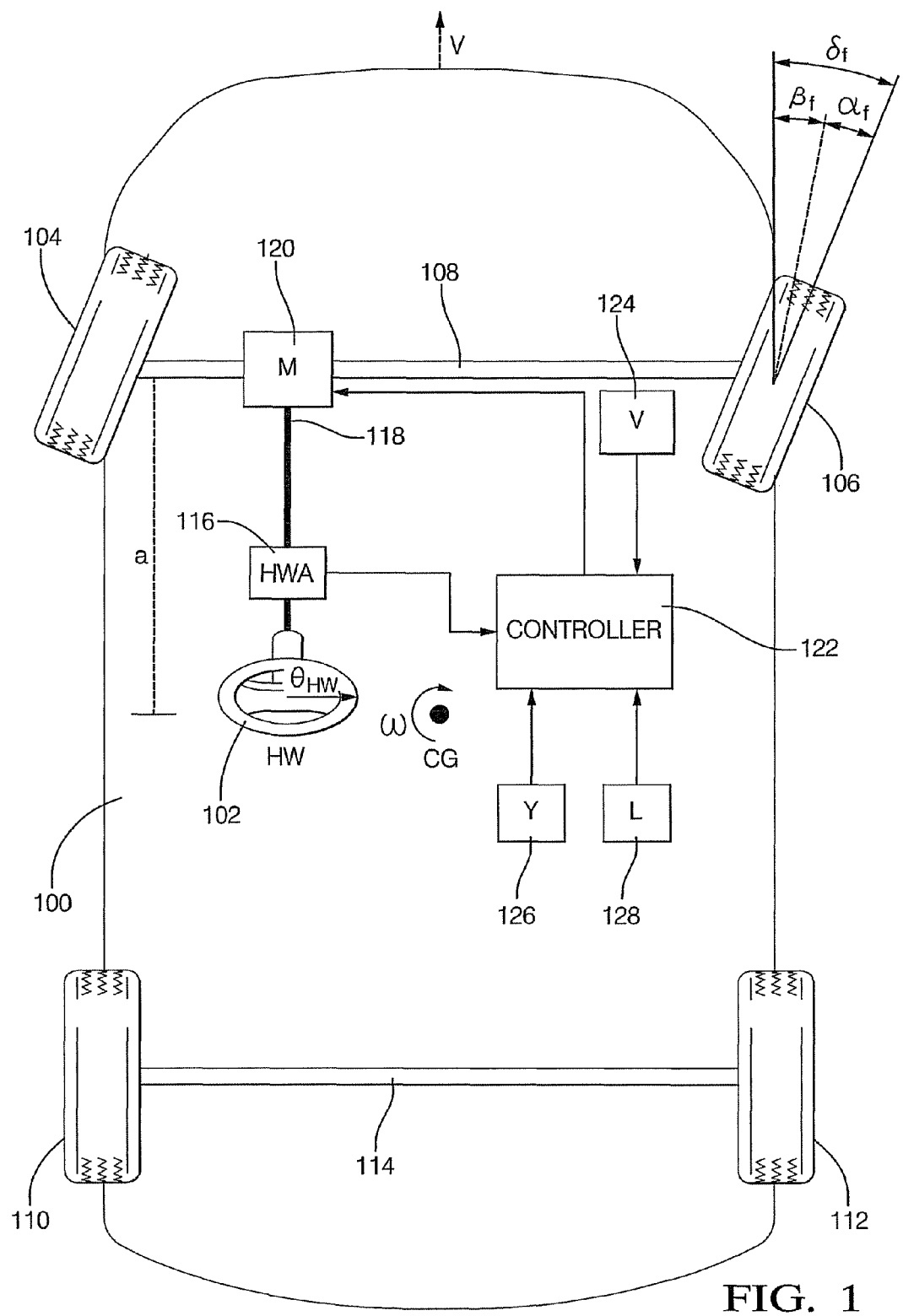
FIG. 1 illustrates one example of a block diagram of a vehicle upon which tire slip angle limiting may be implemented in exemplary embodiments.

A motor vehicle, such as a car or truck, requires a steering system to control the direction of travel of the vehicle. The steering system controls the direction of travel of the vehicle through the control of one or more sets of road wheels. Such steering systems commonly transmit a driver's intent from a handwheel to the road wheels via a mechanical steering linkage. Thus, movement of the handwheel by the driver causes a corresponding movement of the road wheels. Hydraulic and/or electric motor assisting systems are commonly used in combination with such mechanical systems. These assisting systems reduce the driver effort necessary to actuate the mechanical system.

For a vehicular steering system with active steering, such as that used in an automotive active front steering system (AFS), a given motion of the handwheel to an input shaft may be augmented by an additional motion, such as that from a steering actuator, translating into a motion of the steerable road wheels that does not necessarily correspond to the given motion of the handwheel. Consequently, when the steering actuator is inactive, the motion of the steerable road wheels directly corresponds to the handwheel motion due to the articulated mechanical linkage, just as in conventional systems.

The term "active steering" relates to a vehicular control system, which generates an output that is added to or subtracted from a steering angle, wherein the output is typically responsive to elements, such as, e.g., hand wheel angle plus vehicle speed and/or the yaw, and/or lateral acceleration, and/or roll motion of the vehicle. Active steering control systems, such as AFS, typically execute various control algorithms that augment the steering angle through electronic control. Active steering control may improve vehicle-handling stability on a variety of road conditions. Stability control may be continuously active. For higher vehicle speeds, vehicle sensitivity of steering may be smaller. At lower vehicle speeds, park solution sensitivity may be increased and driver workload reduced. Thus, in some situations, an active steering control system may react more quickly and accurately than an average driver to correct transient handling instabilities. In addition, active steering can also provide for variable steering ratios in order to reduce driver fatigue while improving the feel and responsiveness of the vehicle. For example, at very low speeds, such as that which might be experienced in a parking situation, a relatively small rotation of the handwheel may be augmented using an active steering system in order to provide an increased steering angle to the steerable road wheels.

In accordance with exemplary embodiments, a method, system, and computer program product for tire slip angle limiting in a steering control system are provided. Greater control over vehicle steering performance can be achieved through additional augmentation to commands sent to an active steering control system, such as an AFS actuator, providing improvements beyond that supplied by traditional stability and variable ratio control methods. By limiting tire slip angle, the exemplary embodiments of the invention describe a solution that accounts for the nonlinear relationship between tire lateral force and tire slip angle, thereby enabling an active steering control system to mitigate excessive understeer or oversteer of a vehicle. Although exemplary embodiments of the invention are described in relation to AFS, the inventive principles described herein may be applied to a variety of steering control systems, such as electric power steering (EPS), steer by wire (SBW), active rear steering (ARS), or all wheel steering (AWS).

Turning now to the drawings in greater detail, it will be seen that in FIG. 1 there is diagram of a vehicle 100 upon which tire slip angle limiting may be implemented in exemplary embodiments. The vehicle 100 of FIG. 1 includes a handwheel 102 for controlling the angle of a left front road wheel 104 and a right front road wheel 106 in an exemplary front wheel steering configuration. The left and right front road wheels 104 and 106 are coupled through a front axle 108. The distance between the vehicle 100 center of gravity (CG) and the front axle 108 is represented as "a". The vehicle 100 also includes a left rear road wheel 110 and a right rear road wheel 112 coupled through a rear axle 114. In exemplary embodiments, when a driver of the vehicle 100 rotates the handwheel 102, the angular position of the handwheel 102 may be determined through a handwheel angle sensor 116. The handwheel 102 and the front axle 108 may be coupled through a steering shaft 118 and a steering actuator motor and gearing 120 (steering actuator). The steering actuator 120 may include an electric motor in a steering actuation system, such as AFS, EPS, SBW, ARS, or AWS. In exemplary embodiments, the steering actuator 120 is part of an AFS system with variable ratio (VR) controlled actuation. While the steering actuator 120 is depicted in FIG. 1 at the coupling junction between the steering shaft 118 and the front axle 108, in exemplary embodiments the steering actuator 120 may be located at or distributed between the steering shaft 118 and the front axle 108.

In exemplary embodiments, the vehicle 100 also includes a controller 122, which receives input signals from the handwheel angle sensor 116, a vehicle speed sensor 124, a yaw rate sensor 126, and a lateral acceleration sensor 128. The controller 122 may generate output signals to the steering actuator 120. Although only a single controller 122 is depicted, it will be understood by those skilled in the art that the controller 122 may be distributed through multiple control units within the vehicle 100. For example, there may be a local controller at the steering actuator 120 that receives vehicle information over a vehicle network from various smart sensors or a centralized control unit.

The vehicle sensors 116 and 124-128 depicted in FIG. 1 may include various types of technologies to produce input signals with or without additional signal conditioning and processing by the controller 122. The handwheel angle sensor 116 may be any type of sensor capable of generating an angular handwheel position ($\delta_{HW}$). For example, the handwheel angle sensor 116 may be a resolver, a rotational variable differential transformer (RVDT), an encoder, or a potentiometer. The vehicle speed sensor 124 may be a single sensor or a composite of multiple sensors on each axle 108 and 114 or at each road wheel 104, 106, 110, and 112. In exemplary embodiments, the vehicle speed sensor 124 may utilize a magnetic pick-up to determine the speed (V) of the vehicle 100. The yaw rate sensor 126 may determine the rate of vehicle 100 yaw ($\omega$) with a gyroscope. The lateral acceleration sensor 128 may be an accelerometer. While vehicle sensors 116 and 124-128 are depicted as separate sensors, they may be merged into any combination of modules. Furthermore, the vehicle sensors 116 and 124-128 may be integrated in any combination with the steering actuator 120 or the controller 122. Multiple sensors may be provided for redundancy or improved accuracy. In exemplary embodiments, equivalent vehicle information provided by the vehicle sensors 116 and 124-128 may be extracted or synthesized from a combination of vehicle sensors, including other vehicle sensors not depicted in FIG. 1. While sensors 116 and 124-128 are depicted in FIG. 1, not all sensors are needed for all embodiments. For example, in some embodiments, only a vehicle speed and a handwheel angle may be used to perform tire slip angle limiting.

Figure 2:
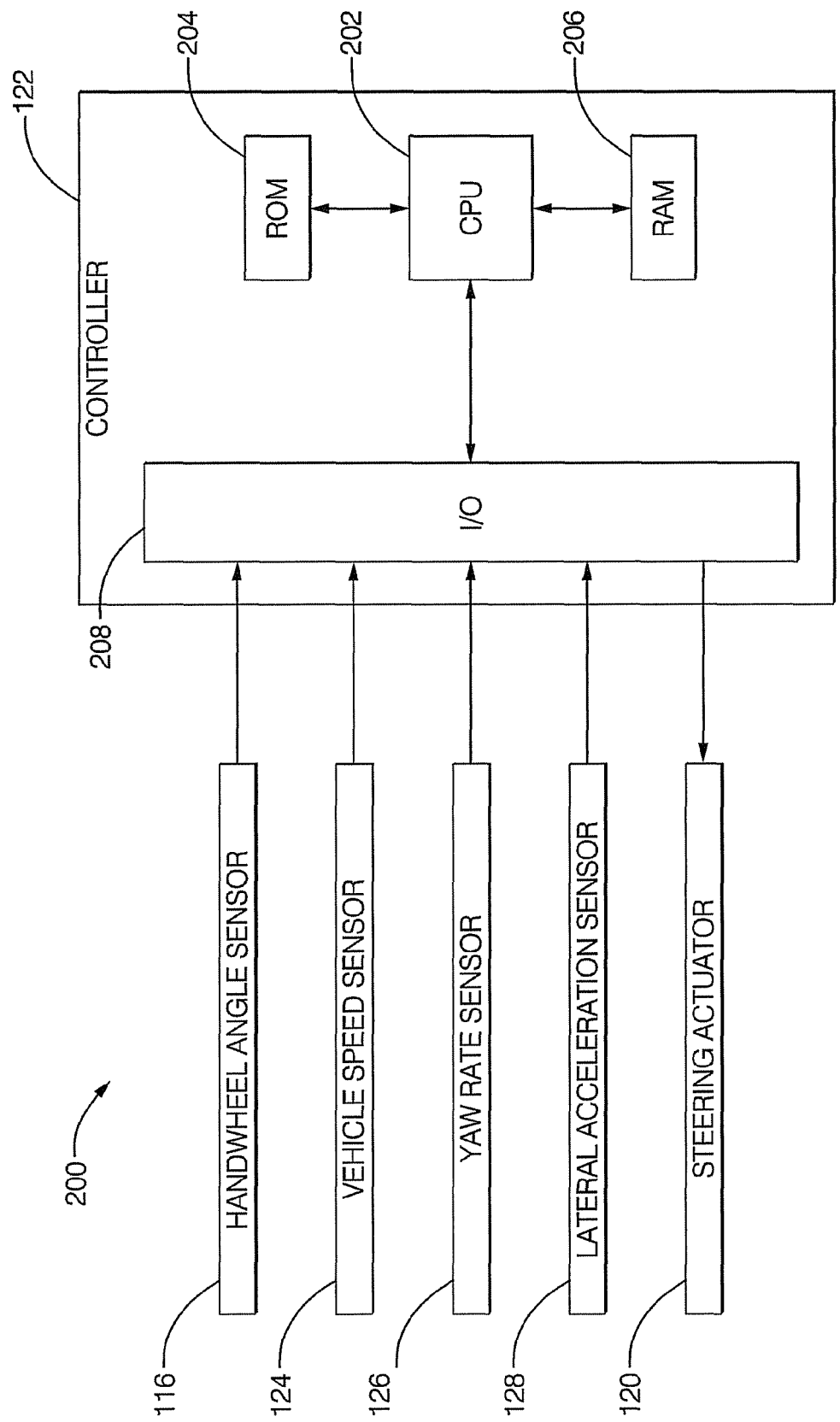
FIG. 2 illustrates a block diagram of the controller used in FIG. 1 in exemplary embodiments.

Turning now to FIG. 2, a block diagram 200 of the controller 122 is depicted in accordance with exemplary embodiments. The controller 122 may collect various vehicle signals to control the steering actuator 120. The controller 122 may execute computer readable instructions for functions such as VR control logic, vehicle stability logic, and tire slip angle limiting logic, which may be embodied as computer program products. In exemplary embodiments, the controller 122 includes a central processing unit (CPU) 202, a read-only memory (ROM) 204, a volatile memory such as a random access memory (RAM) 206, and an I/O interface 208. The CPU 202 operably communicates with the ROM 204, the RAM 206, and the I/O interface 208. Computer readable media including the ROM 204 and the RAM 206 may be implemented using any of a number of known memory devices such as PROMs, EPROMs, EEPROMS, flash memory or any other electric, magnetic, optical or combination memory device capable of storing data, some of which represent executable instructions used by the CPU 202. In exemplary embodiments, the CPU 202 communicates via the I/O interface 208 with the handwheel angle sensor 116, the vehicle speed sensor 124, the yaw rate sensor 126, the lateral acceleration sensor 128, and the steering actuator 120. In alternate exemplary embodiments, the CPU 202 communicates via the I/O interface 208 with the handwheel angle sensor 116, the vehicle speed sensor 124, and the steering actuator 120. While vehicle sensors 116 and 124-128 are depicted as separate inputs to the I/O interface 208, the signals may be otherwise coupled, packetized, or encoded.

Figure 3:
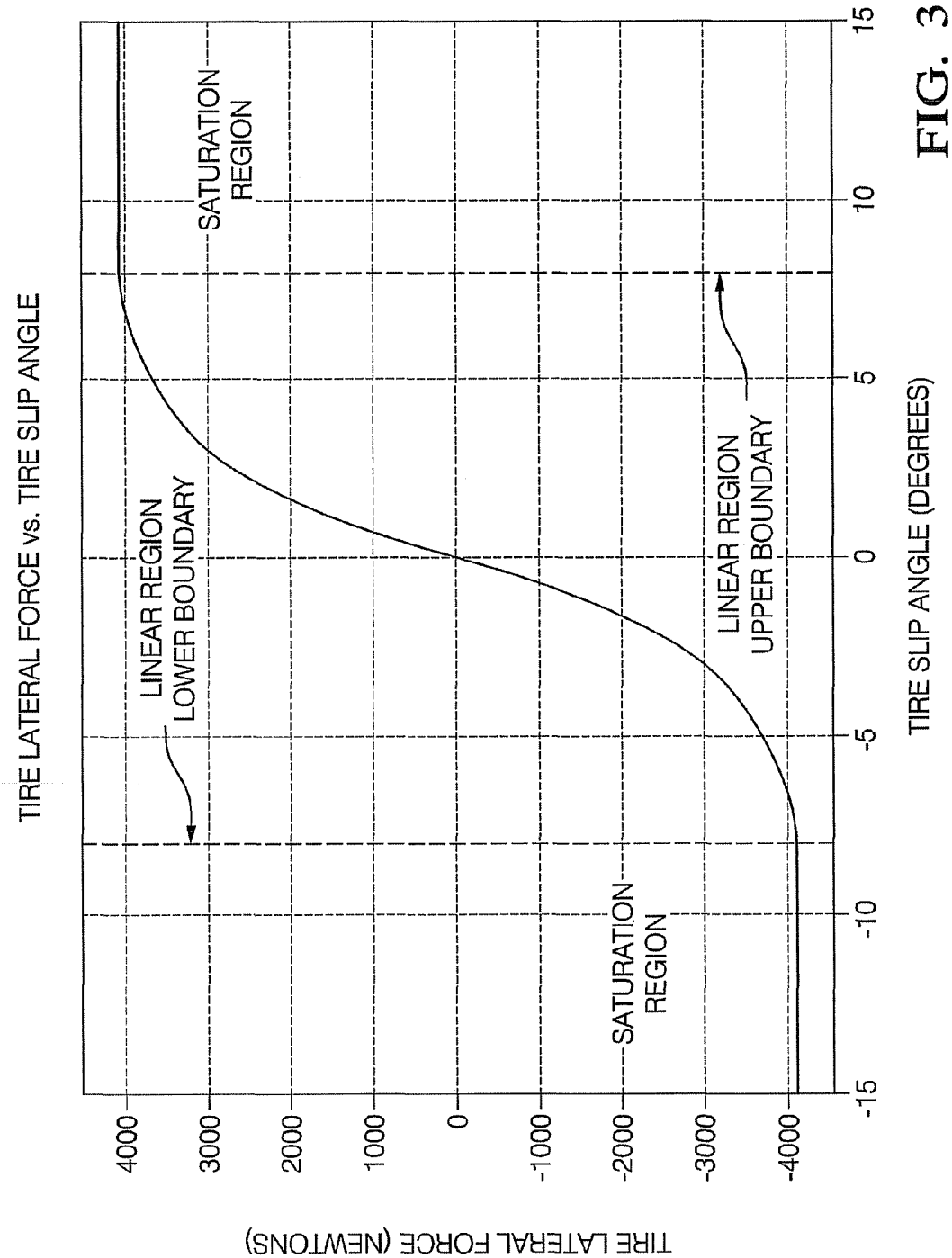
FIG. 3 illustrates an exemplary plot of tire lateral force versus tire slip angle.

Exemplary embodiments will now be described in reference to the front wheels 104 and 106 of the vehicle 100 of FIG. 1, although it will be understood that the inventive principles described herein may also be applied to the rear wheels 110 and 112, or any combination thereof. As a driver of the vehicle 100 rotates the handwheel 102, creating a handwheel angle ($\delta_{HW}$) relative to the vehicle, a tire steer angle ($\delta_f$) is imparted upon the front wheels 104 and 106. The lateral rotation of the front wheels 104 and 106 applies a lateral tire force on each wheel. As the vehicle yaws in response to rotating the front wheels 104 and 106, the portion of the road wheels 104 and 106 in contact with a travel surface (e.g., a road) may not align with the direction of travel of the vehicle. The actual change in lateral vehicle travel direction at the front of the vehicle 100 is referred to as a vehicle side slip angle ($\beta_f$) or a vehicle slip angle. The difference between the vehicle side slip angle ($\beta_f$) and the tire steer angle ($\delta_f$) is the tire slip angle ($\alpha_f$), which is expressed by the equation: $\alpha_f = \delta_f - \beta_f$. A rapid maneuver typically creates a larger tire slip angle ($\beta_f$) in a positive or negative direction, resulting in a larger positive or negative tire lateral force. FIG. 3 depicts an exemplary embodiment of a relationship between lateral tire force and tire slip angle.

To prevent extreme saturation of the tire lateral force, the tire slip angle ($\alpha_f$) may be limited so that it does not go above a positive maximum value (+$\alpha_{LIMIT}$) or below a negative minimum value (-$\alpha_{LIMIT}$), which can be described by the inequality relationship: $-\alpha_{LIMIT} < \alpha_f < +\alpha_{LIMIT}$. In exemplary embodiments as depicted in FIG. 3, maximum (+$\alpha_{LIMIT}$) and minimum (-$\alpha_{LIMIT}$) limits of the tire slip angle ($\alpha_f$) may be set to constant values, such as +8 and -8 degrees, where the tire lateral force enters the positive and negative saturation regions. By substitution of the equation, $\alpha_f = \delta_f - \beta_f$, into the inequality relationship, the result is: $-\alpha_{LIMIT} < (\delta_f - \beta_f) < +\alpha_{LIMIT}$, which can be rearranged as: $(\beta_f - \alpha_{LIMIT}) < \delta_f < (\beta_f + \alpha_{LIMIT})$. The inequality indicates that the tire steer angle ($\delta_f$) may be held within a bound of the vehicle side slip angle ($\beta_f$) to avoid the lateral tire force saturation region. The controller 122 may be used in conjunction with the steering actuator 120 to control the tire steer angle ($\delta_f$), keeping the angle within a set of upper and lower limits.

In an AFS system, the tire steer angle ($\delta_f$) is typically the mechanical combination of two inputs, the handwheel angle ($\delta_{HW}$) and the AFS motor angle ($\delta_{AFS}$): $\delta_f = \delta_{HW} + \delta_{AFS}$. In exemplary embodiments, the steering actuator 120 is an AFS motor used for VR control and a tire slip angle limiting function. Therefore, for example, the AFS motor angle command ($\delta_{AFS}$) may be the sum of two terms, a variable ratio command ($\delta_{AFS\_VR}$) and a limiting function command ($\delta_{AFS\_LIMIT1}$). Thus the tire steer angle ($\delta_f$) is calculated as: $\delta_f = \delta_{HW} + \delta_{AFS\_VR} + \delta_{AFS\_LIMIT1}$. Through substitution, the slip angle bounding inequality results in: $(\beta_f - \alpha_{LIMIT}) < (\delta_{HW} + \delta_{AFS\_VR} + \delta_{AFS\_LIMIT1}) < (\beta_f + \alpha_{LIMIT})$. This relationship provides the basis for the calculation of the AFS limit command ($\delta_{AFS\_LIMIT1}$), also referred to as the limiting function (LIMIT1), to achieve the tire slip angle limit effect in exemplary embodiments.

Figure 4:
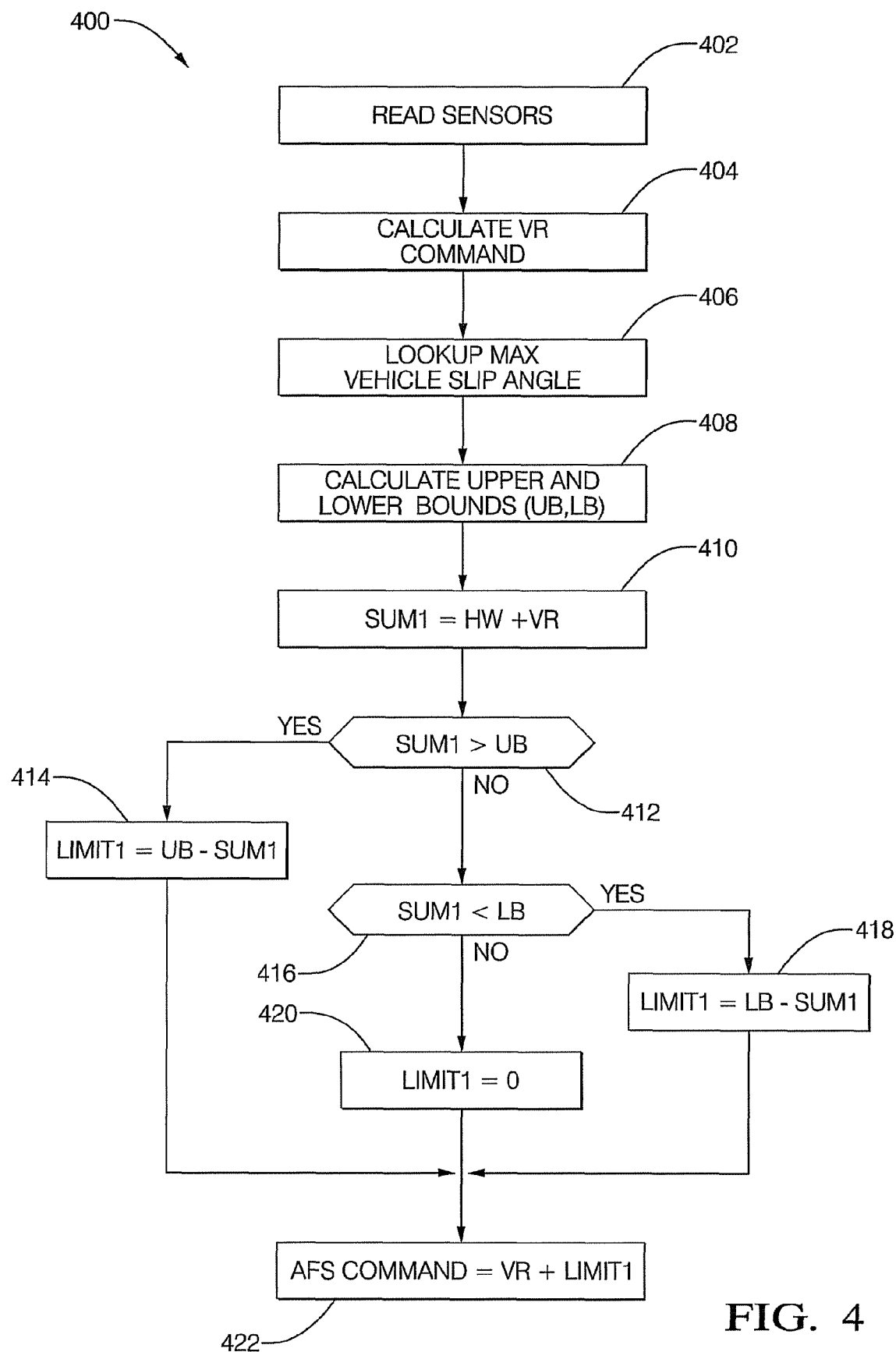
FIG. 4 illustrates one example of a process flow diagram for tire slip angle limiting in accordance with exemplary embodiments.
Figure 5:
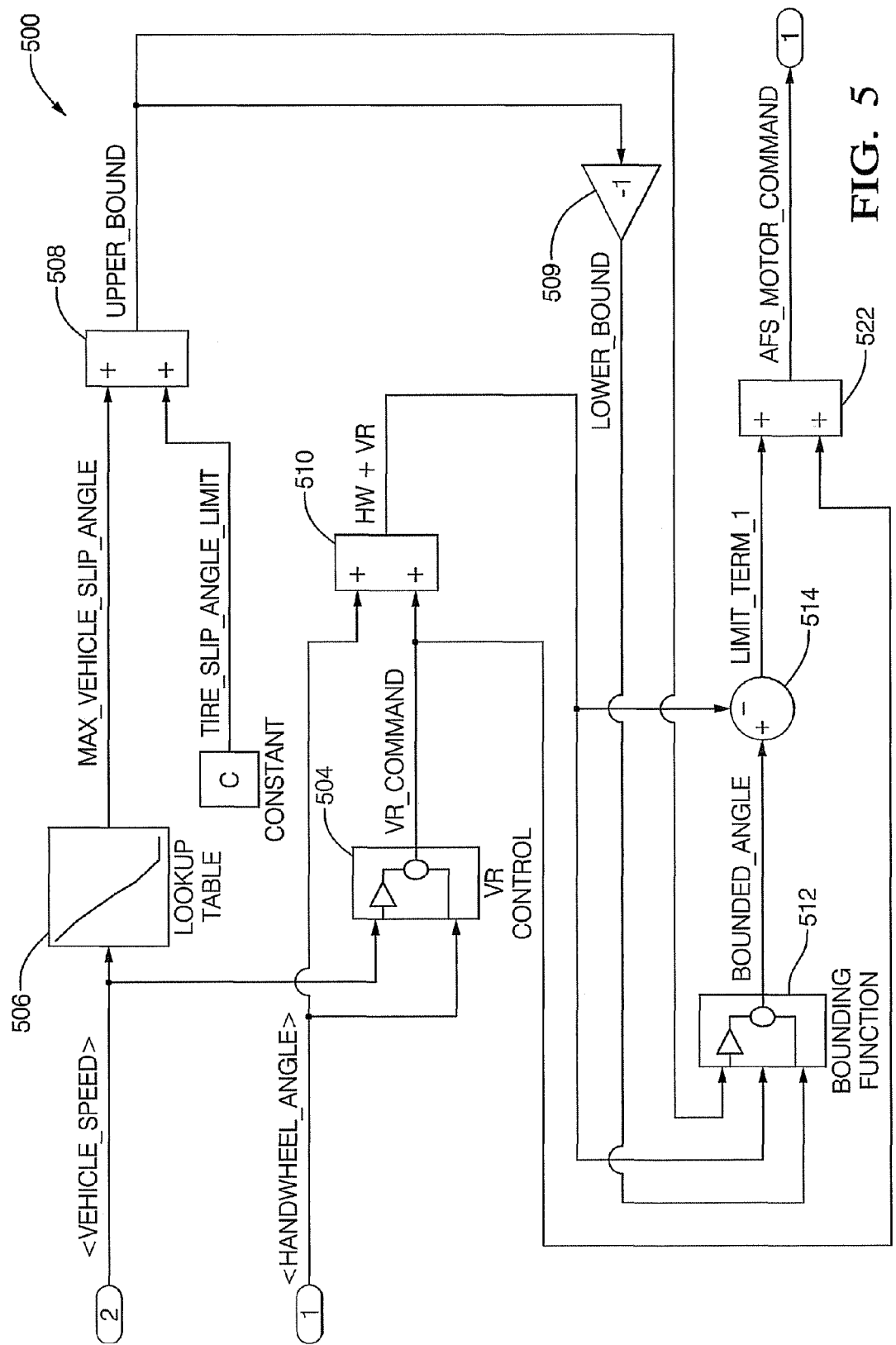
FIG. 5 illustrates an example of a dataflow diagram for tire slip angle limiting corresponding to FIG. 4 in accordance with exemplary embodiments.

Turning now to FIGS. 4 and 5, a process flow diagram 400 and a data flow diagram 500 for tire slip angle limiting via the controller 122 will now be described in accordance with exemplary embodiments. At step 402, the controller 122 reads sensors. In exemplary embodiments, the controller 122 reads the vehicle speed sensor 124 to determine a vehicle speed (V), and the handwheel angle sensor 116 is read to determine a handwheel angle ($\delta_{HW}$). At step 404, the controller 122 calculates a VR command ($\delta_{AFS\_VR}$). The VR command ($\delta_{AFS\_VR}$) may be based upon the vehicle speed (V) and the handwheel angle ($\delta_{HW}$) as depicted in function block 504. In exemplary embodiments, the VR command ($\delta_{AFS\_VR}$) is calculated by multiplying the handwheel angle ($\delta_{HW}$) by a gain value that may vary with the vehicle speed (V). For example, at low speed the gain value may be set to +1.0, while at high speed the gain value may be set to −0.5. Gains values may be determined as a continuous function of the vehicle speed (V) using an equation or a look-up table.

At step 406, a maximum vehicle slip angle ($\beta_{f\_max}$) is determined through a lookup table 506. The lookup table 506 may be a function of the vehicle speed (V). The lookup table 506 values may be established experimentally for a particular vehicle and tire by performing tests at various speeds. At step 408, an upper bound angle limit (UB) and a lower bound angle limit (LB) are calculated. In exemplary embodiments, UB is the sum of the maximum vehicle slip angle ($\beta_{f\_max}$) and a constant (C) tire slip angle limit ($\alpha_{LIMIT}$) as depicted at summing block 508. The constant (C) may be determined from analyzing the saturation limits of force-slip curves, such as the curve depicted in FIG. 3. In exemplary embodiments, the constant (C) is set as the maximum value for all road surfaces, which may be determined experimentally for a particular vehicle and tire. To simplify the lookup table 506, only positive values of the vehicle slip angle ($\beta_f$) may be output as the maximum vehicle slip angle ($\beta_{f\_max}$); therefore, the maximum vehicle slip angle ($\beta_{f\_max}$) must be negated when calculating the LB (i.e., $\beta_f = -\beta_{f\_max}$ for the lower boundary). The LB may be set equal to −UB, as output from multiplying UB by a gain block 509, the gain block 509 set to a value of negative one. At step 410, a temporary sum value (SUM1) is set equal to the sum of the handwheel angle ($\delta_{HW}$) plus the VR command ($\delta AFS_{\_VR}$) as depicted at summing block 510.

At steps 412-420, process steps are performed to calculate a limiting function (LIMIT1), which may be a positive, negative, or zero value. At step 412, if SUM1 is greater than UB, then step 414 is performed; otherwise, step 416 is performed. At step 414, the limiting function is set equal to the upper bound angle limit minus the temporary sum value (LIMIT1=UB−SUM1). At step 416, if SUM1 is less than LB, then step 418 is performed; otherwise, step 420 is performed. At step 418, the limiting function is set equal to the lower bound angle limit minus the temporary sum value (LIMIT1=LB−SUM1). At step 420, the limiting function is set equal to zero (LIMIT1=0). After steps 414, 418, or 420, step 422 is performed. At step 422, the AFS motor angle command ($\delta_{AFS}$) is set equal to the VR command ($\delta_{AFS\_VR}$) plus the limiting function (LIMIT1).

In exemplary embodiments, the limiting function (LIMIT1) may be calculated by limiting the output of the summing block 510 through a bounding function 512, and subtracting the output of the summing block 510 from the output of the bounding function 512 at difference block 514. The bounding function 512 outputs a bounded angle limited between the upper bound angle limit and the lower bound angle limit. Summing block 522 adds the limiting function (LIMIT1) and the VR command ($\delta_{AFS\_VR}$) to produce an AFS motor angle command ($\delta_{AFS}$). Thus the blocks 512-522 of FIG. 5 produce an equivalent result as the process steps 412-422 of FIG. 4.

Therefore as depicted in FIGS. 4 and 5, when the sum of the driver's handwheel input ($\delta_{HW}$) plus the variable ratio command ($\delta_{AFS\_VR}$) is greater than the upper bound ($\beta_f+\alpha_{LIMIT}$), a counteracting steer may be applied through the AFS motor, i.e., steering actuator 120, to keep the total tire steer angle within the upper bound. Similarly, when the sum of the driver's handwheel input ($\delta_{HW}$) plus the variable ratio command ($\delta_{AFS\_VR}$) is less than the lower bound ($\beta_f-\alpha_{LIMIT}$), a counteracting steer may be applied through the AFS motor to keep the total tire steer angle within the lower bound.

Turning now to FIGS. 6A-6F, exemplary plots are depicted for a Corvette in a ramped-steer maneuver at 50 MPH both with and without tire slip angle limiting enabled according to exemplary embodiments as previously described with reference to FIGS. 4 and 5. In the exemplary plots depicted as FIGS. 6A-6F, the VR command equals zero for simplicity ($\delta_{AFS\_VR}=0$), better highlighting the effects of tire slip angle limiting.

Figure 6:
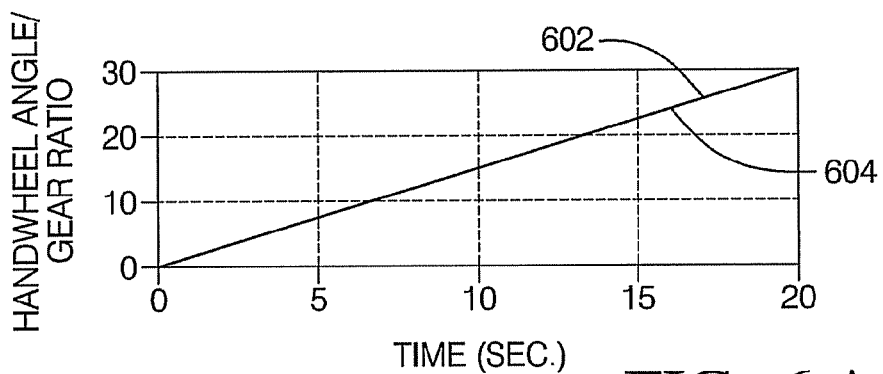
FIGS. 6A-6F are a series of related FIGs. illustrating input and output conditions for an exemplary ramped steer maneuver both with and without tire slip angle limiting enabled in accordance with the exemplary embodiments depicted in FIGS. 4 and 5.
Figure 6:
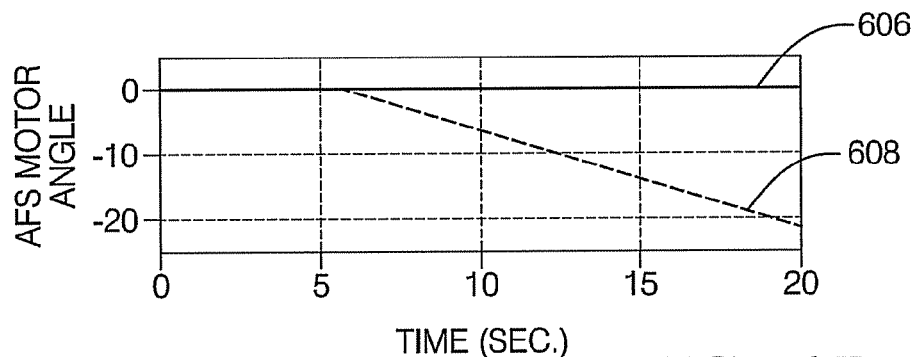
Figure 6:
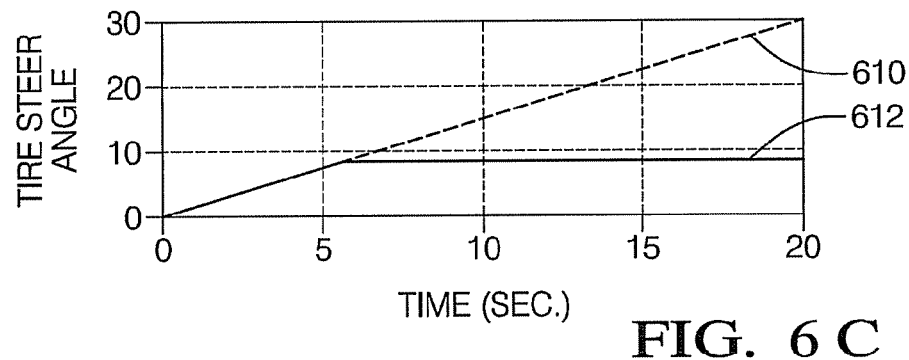
Figure 6:
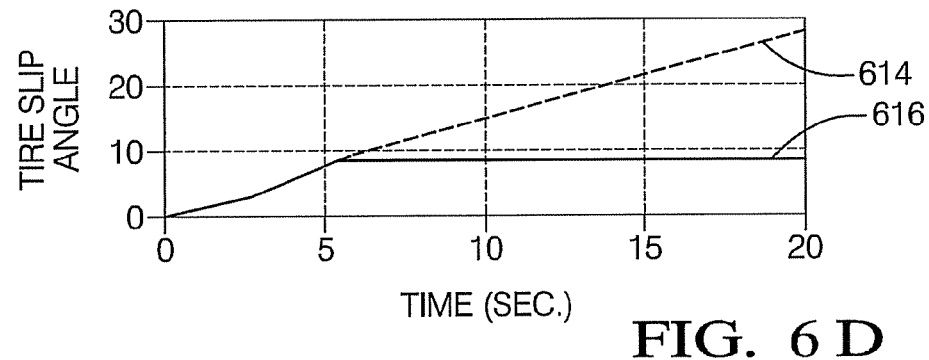
Figure 6:
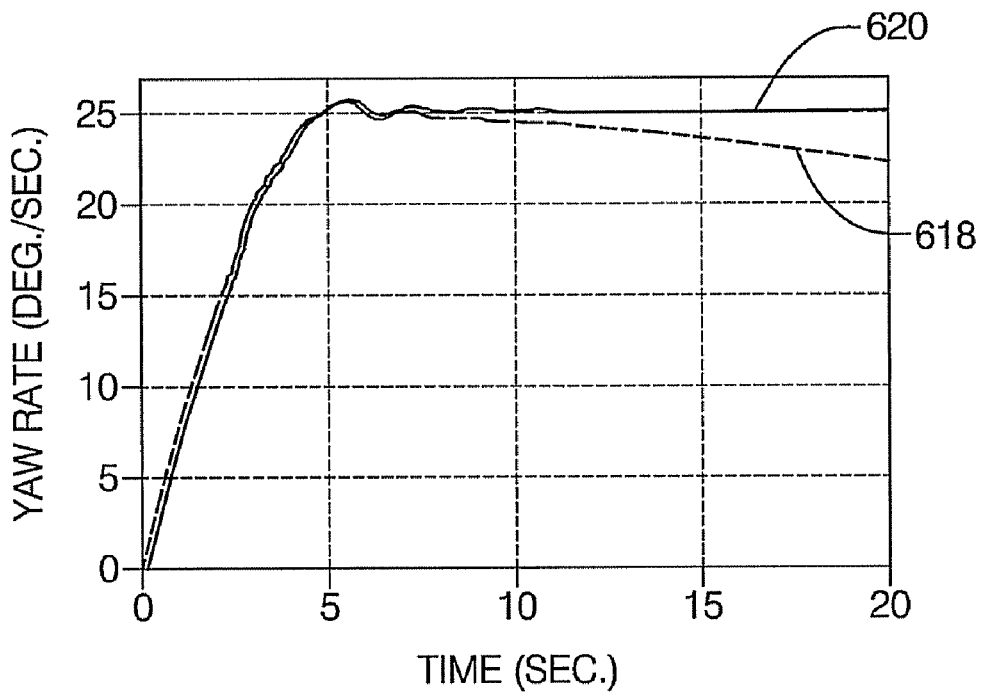
Figure 6:
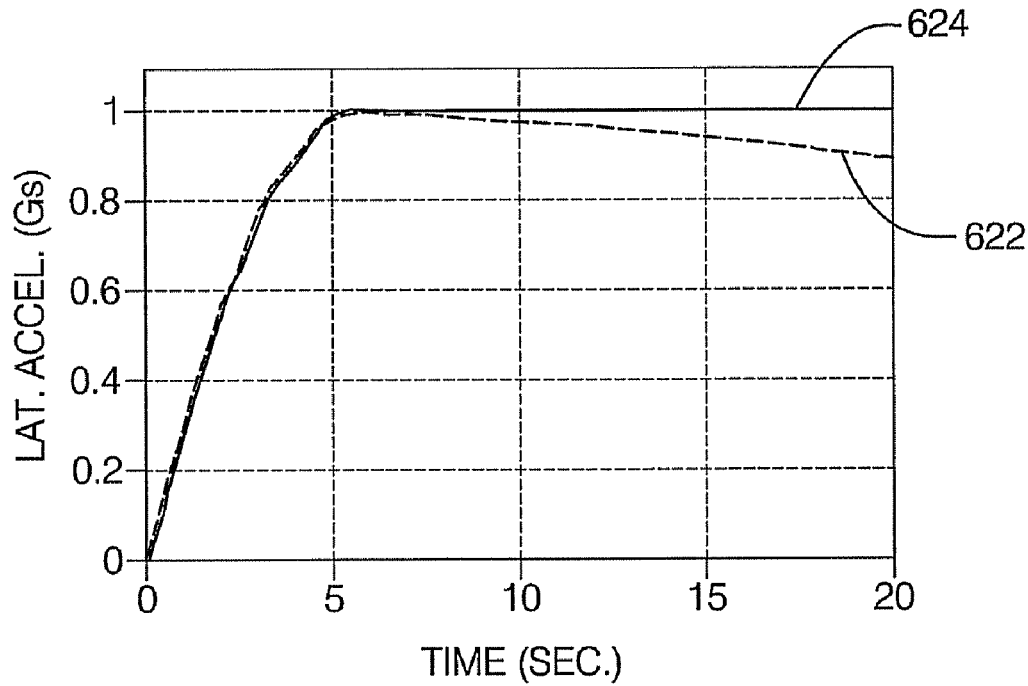

FIG. 6A illustrates the system input as handwheel angle divided by gear ratio versus time. The use of handwheel angle divided by gear ratio on the y-axis normalizes the degrees of handwheel angle movement to the same scale as the AFS motor angle ($\delta_{AFS}$), tire steer angle ($\delta_f$), and tire slip angle ($\alpha_f$). The lines 602 and 604 illustrate that the same ramp input is used to establish common conditions for FIGS. 6B-6F, where line 602 has tire slip angle limiting disabled, and line 604 has tire slip angle limiting enabled.

FIG. 6B illustrates the AFS motor angle versus time. Line 606 depicts that the AFS motor angle remains at zero when tire slip angle limiting is disabled. Line 608 shows that the AFS control becomes active at time=5.7 seconds in the example, when tire slip angle limiting is enabled. When the AFS control becomes active, the AFS motor angle ($\delta_{AFS}$) decreases linearly providing counter steer in the example depicted by line 608. The inactivity while tire slip angle limiting is disabled is also apparent in line 610 of FIG. 6C and line 614 of FIG. 6D. Line 612 of FIG. 6C, tire steer angle versus time, illustrates that the total tire steer angle ($\delta_f$) is limited by the counter steer provided by the AFS motor when tire slip angle limiting is active and enabled. Thus the tire slip angle ($\alpha_f$) is limited in line 616 of FIG. 6D, tire slip angle versus time, by the AFS motor when tire slip angle limiting is active and enabled. Because of the limiting action, the exemplary vehicle 100 is able to maintain maximum lateral force and thus achieve a tighter turn radius as depicted in FIGS. 6E and 6F. FIG. 6E depicts yaw rate in degrees per second versus time and FIG. 6F depicts lateral acceleration in Gs versus time. Line 620 illustrates that a higher yaw rate can be maintained when tire slip angle limiting is enabled and active as compared to line 618, where tire slip angle limiting is disabled. Similarly, line 624 illustrates that a higher lateral acceleration can be maintained when tire slip angle limiting is enabled and active as compared to line 622, where tire slip angle limiting is disabled.

In alternative exemplary embodiments, the steering actuator 120, such as an AFS motor, may also be used for vehicle stability control purposes (e.g., yaw rate control and/or rollover prevention) through additional stability control logic. A stability control command is typically a desired change of yaw moment ($\Delta M_z$) which can be converted into a desired change of front axle tire lateral force: $\Delta M_z = a \Delta F_{yf}$, where "a" is the distance from the vehicle 100 center of gravity (CG) to the front axle 108 of FIG. 1. Since tire lateral force is held within the linear region, a desired change of lateral force $\Delta F_{yf}$ can be achieved by a proportional (linear) change of tire slip angle: $\Delta M_z = a \Delta F_{yf} = a C_\alpha \Delta \alpha_f$, where "$C_\alpha$" is the slope of the force/alpha curve, such as the curve depicted in FIG. 3. Thus, for stability control purposes, the desired change of tire slip angle is: $\Delta \alpha_{f\_STABILITY} = \Delta M_z / (a C_\alpha)$.

In exemplary embodiments, the addition of a stability term to the AFS steer command may cause the tire slip angle to exceed either its upper limit or its lower limit. Through a second limiting function ($\delta_{AFS\_LIMIT2}$) applied after the inclusion of the stability term ($\Delta \alpha_{f\_STABILITY}$), the tire slip angle may be held within the linear limits. Thus for exemplary embodiments that include angle augmentation through both a VR command and a stability command, the total AFS motor angle command ($\delta_{AFS}$) is the sum of four terms: the variable ratio command ($\delta_{AFS\_VR}$), the first limiting function command ($\delta_{AFS\_LIMIT1}$), the stability command ($\Delta \alpha_{f\_STABILITY}$), and the second limiting function ($\delta_{AFS\_LIMIT2}$). The tire steer angle may be calculated as: $\delta_f = \delta_{HW} + \delta_{AFS} = \delta_{HW} + \delta_{AFS\_VR} + \delta_{AFS\_LIMIT1} + \Delta \alpha_{f\_STABILITY} + \delta_{AFS\_LIMIT2}$.

The first limiting function ($\delta_{AFS\_LIMIT1}$) may be determined in the same manner as described in the exemplary embodiments associated with the FIGS. 4 and 5. The second limiting function ($\delta_{AFS\_LIMIT2}$), can be derived through substitution as: $(\beta_f - \alpha_{LIMIT}) < (\delta_{HW} + \delta_{AFS\_VR} + \delta_{AFS\_LIMIT1} + \Delta \alpha_{f\_STABILITY} + \delta_{AFS\_LIMIT2}) < (\beta_f + \alpha_{LIMIT})$.

The second limiting function ($\delta_{AFS\_LIMIT2}$) may be determined according to the following logic. If the sum of the driver's handwheel input ($\delta_{HW}$) plus the variable ratio command ($\delta_{AFS\_VR}$) plus the first limiting function ($\delta_{AFS\_LIMIT1}$) plus the stability command ($\Delta \alpha_{f\_STABILITY}$) is greater than the upper bound ($\beta_f + \alpha_{LIMIT}$), then apply a counteracting steer to keep the total tire steer angle within the upper bound. Else, if the sum is less than the lower bound ($\beta_f - \alpha_{LIMIT}$), then apply a counteracting steer to keep the total tire steer angle within the lower bound.

Two limiting functions $\delta_{AFS\_LIMIT1}$ and $\delta_{AFS\_LIMIT2}$, which are also referred to as LIMIT1 and LIMIT2, may be used in implementing the tire slip angle limiting processes. The first limiting function is based on the driver's input (handwheel plus VR control contribution). In cases where the driver has steered excessively, the first limiting function operates to remove the excessive steering by the driver, and thus keep the tire slip angle within the desirable limits. Because of this, the stability control is then able to superimpose a change of steer angle which adjusts the operating point along the linear portion of a force/alpha curve. In case the stability control command is so large that it might cause the tire slip angle to exceed the desirable limits, the second limiting function ($\delta_{AFS\_LIMIT2}$) operates to remove any excess angle due to the stability control contribution, and thus keeps the tire slip angle within the desirable limits.

Figure 7:
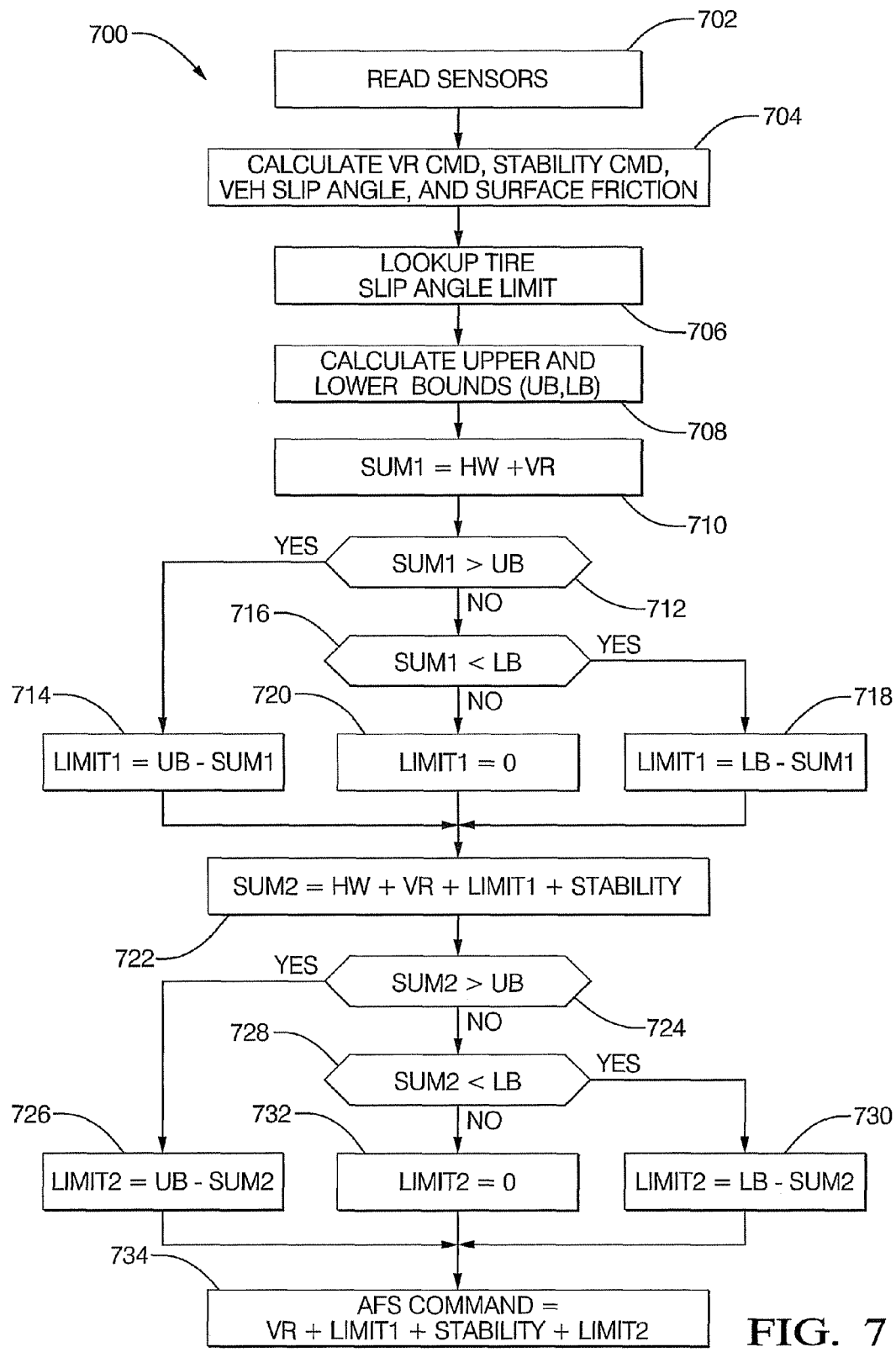
FIG. 7 illustrates another example of a process flow diagram for tire slip angle limiting in accordance with alternative exemplary embodiments.
Figure 8A:
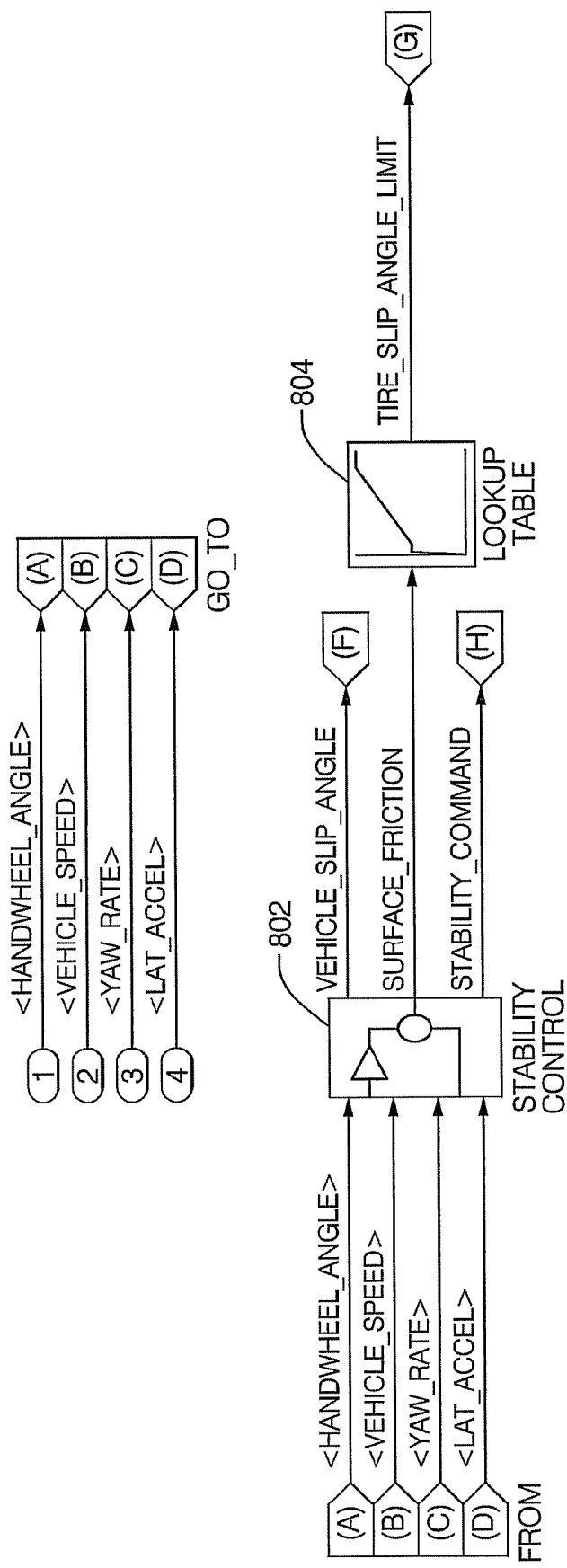
FIG. 8 illustrates another example of a dataflow diagram for tire slip angle limiting corresponding to FIG. 7 in accordance with alternative exemplary embodiments.
Figures 8B, 8C:
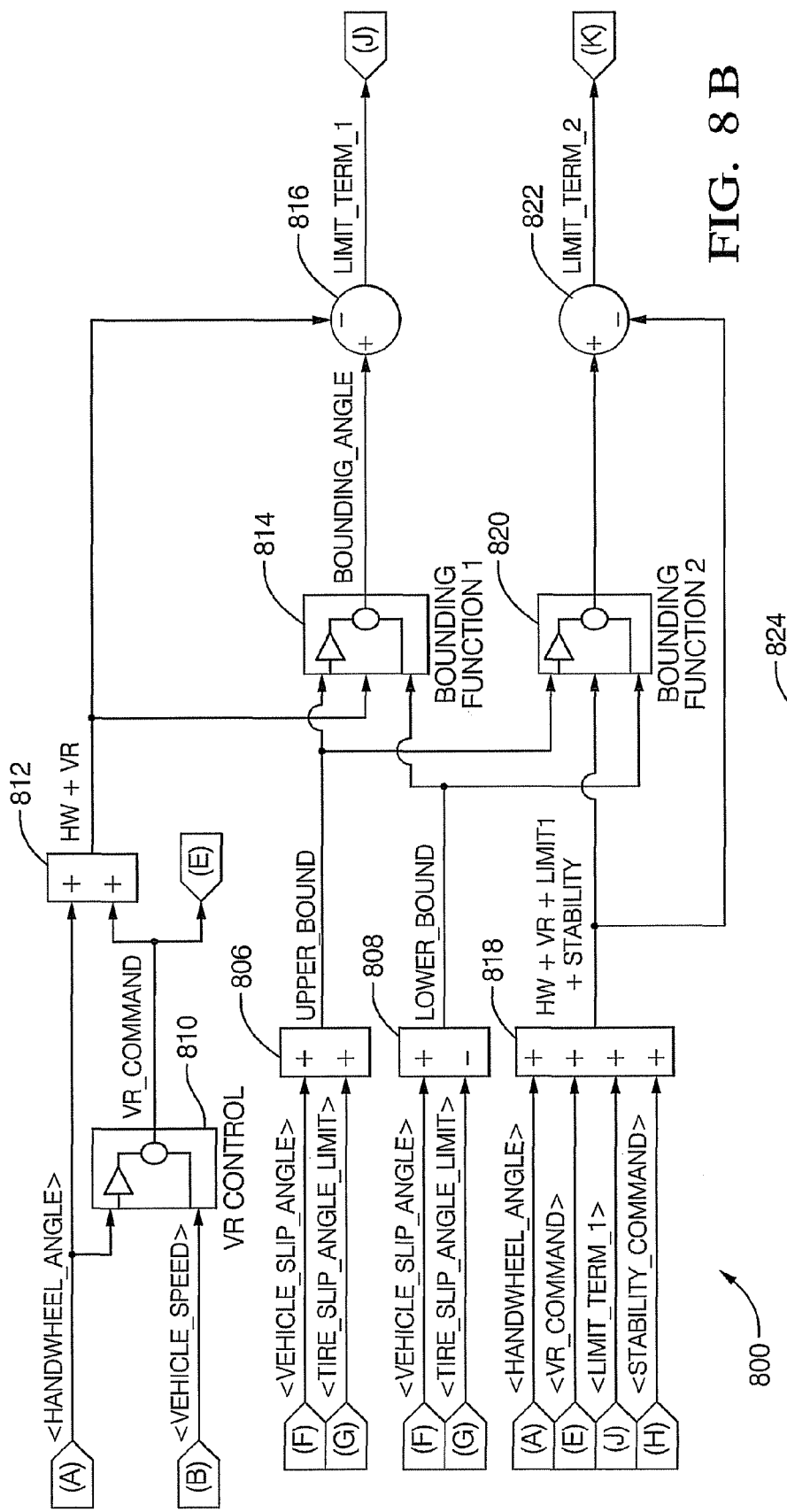

Turning now to FIGS. 7 and 8, a process flow diagram 700 and a data flow diagram 800 for tire slip angle limiting via the controller 122 will now be described in accordance with exemplary embodiments. At step 702, the controller 122 reads sensors. In exemplary embodiments, the controller 122 reads the handwheel angle sensor 116 to determine a handwheel angle ($\delta_{HW}$); the vehicle speed sensor 124 is read to determine a vehicle speed (V); the yaw rate sensor 126 is read to determine a rate of vehicle 100 yaw ($\omega$); and, the lateral acceleration sensor 128 is read to determine a lateral acceleration. At step 704, the controller 122 calculates a VR command ($\delta_{AFS\_VR}$). The VR command ($\delta AFS_{VR}$) may be based upon the vehicle speed (V) and the handwheel angle ($\delta_{HW}$) as depicted in function block 810. In exemplary embodiments, function block 810 is equivalent to the function block 504 of FIG. 5, as previously described.

Also at step 704, stability control logic 802 calculates a vehicle slip angle ($\beta_f$), a surface friction ($\mu$), and a stability command ($\Delta \alpha_{f\_STABILITY}$) based upon measured vehicle conditions, such as the handwheel angle ($\delta_{HW}$), the vehicle speed (V), the vehicle yaw rate ($\omega$), and the lateral acceleration. The contents of the stability control logic 802 may be any one of several well-known methods. The vehicle slip angle ($\beta f$) may be derived from measured vehicle conditions. In exemplary embodiments, the vehicle slip angle ($\beta_f$) may be estimated using a closed loop observer calculation that relies on knowledge of certain vehicle parameters such as mass, wheelbase, and tire cornering stiffness, along with instantaneous measurements from input sensors. The surface friction ($\mu$) may be derived from measured vehicle conditions. In exemplary embodiments, the surface friction ($\mu$) is estimated by determining when the vehicle tire's lateral forces are in a saturation condition, and then using the lateral acceleration, as measured by the lateral acceleration sensor 128 of FIG. 1, as an indicator of surface friction capability. The stability command ($\Delta \alpha_{f\_STABILITY}$) may be calculated in response to vehicle motion derived from measured vehicle conditions. The vehicle motion may include oversteer, understeer, or rollover. In exemplary embodiments, the stability command ($\Delta \alpha_{f\_STABILITY}$), may be derived from the following sequence of calculations:

1. Determine a target yaw rate based on the handwheel angle ($\delta_{HW}$) and the vehicle speed (V).
2. Determine a yaw rate error as a difference between the target yaw rate and the vehicle yaw rate ($\omega$).
3. Determine a yaw moment command ($\Delta M_z$) based on the yaw rate error, vehicle side slip angle ($\beta_f$), and roll motion.
4. Transform the yaw moment command ($\Delta M_z$) into a lateral force command ($\Delta F_{yf}$) and then into the stability command ($\Delta \alpha_{f\_STABILITY}$) for tire slip angle control.

At step 706, a tire slip angle limit ($\alpha_{LIMIT}$) may be determined from a lookup table 804 as a function of the surface friction ($\mu$). The $\alpha_{LIMIT}$ values in the lookup table 804 may be established experimentally for a particular vehicle and tire by performing tests on roads with various surface friction coefficients. At step 708, an upper bound angle limit (UB) and a lower bound angle limit (LB) are calculated. In exemplary embodiments, UB is the sum of the vehicle slip angle ($\beta_f$) and the tire slip angle limit ($\alpha_{LIMIT}$) as depicted at summing block 806. The LB may be set equal to the vehicle slip angle ($\beta_f$) minus the tire slip angle limit ($\alpha_{LIMIT}$) as depicted at difference block 808. At step 710, a first temporary sum value (SUM1) is set equal to the sum of the handwheel angle ($\delta_{HW}$) plus the VR command ($\delta_{AFS\_VR}$) as depicted at summing block 812.

At steps 712-720, process steps are performed to calculate a first limiting function (LIMIT1), which may be a positive, negative, or zero value. At step 712, if SUM1 is greater than UB, then step 714 is performed; otherwise, step 716 is performed. At step 714, the first limiting function is set equal to the upper bound angle limit minus the first temporary sum value (LIMIT1=UB−SUM1). At step 716, if SUM1 is less than LB, then step 718 is performed; otherwise, step 720 is performed. At step 718, the first limiting function is set equal to the lower bound angle limit minus the first temporary sum value (LIMIT1=LB−SUM1). At step 720, the first limiting function is set equal to zero (LIMIT1=0). After steps 714, 718, or 720, step 722 is performed.

In exemplary embodiments, the first limiting function (LIMIT1) may be calculated by limiting the output of the summing block 812 through a bounding function 814, and subtracting the output of the summing block 812 from the output of the bounding function 814 at difference block 816.

The bounding function 814 outputs a first bounded angle limited between the upper bound angle limit and the lower bound angle limit. Thus the blocks 812-816 of FIG. 8 produce an equivalent result as the process steps 712-720 of FIG. 7.

At step 722, a second temporary sum (SUM2) is set equal to the sum of the handwheel angle ($\delta_{HW}$), plus the VR command ($\delta_{AFS\_VR}$), plus the first limiting function (LIMIT1), plus the stability command ($\Delta\alpha_{f\_STABILITY}$) as depicted at summing block 818. At steps 724-732, process steps are performed to calculate a second limiting function (LIMIT2), which may be a positive, negative, or zero value. At step 724, if SUM2 is greater than UB, then step 726 is performed; otherwise, step 728 is performed. At step 726, the second limiting function is set equal to the upper bound angle limit minus the second temporary sum value (LIMIT2=UB−SUM2). At step 728, if SUM2 is less than LB, then step 730 is performed; otherwise, step 732 is performed. At step 730, the second limiting function is set equal to the lower bound angle limit minus the second temporary sum value (LIMIT2=LB−SUM2). At step 732, the second limiting function is set equal to zero (LIMIT2=0). After steps 726, 730, or 732, step 734 is performed.

In exemplary embodiments, the second limiting function (LIMIT2) may be calculated by limiting the output of the summing block 818 through a bounding function 820, and subtracting the output of the summing block 818 from the output of the bounding function 820 at difference block 822. The bounding function 820 outputs a second bounded angle limited between the upper bound angle limit and the lower bound angle limit. Thus the blocks 818-822 of FIG. 8 produce an equivalent result as the process steps 724-732 of FIG. 7. At step 734, the AFS motor angle command ($\delta_{AFS}$) is set equal to the VR command ($\delta_{AFS\_VR}$), plus the first limiting function (LIMIT1), plus the stability command ($\Delta\alpha_{f\_STABILITY}$), plus the second limiting function (LIMIT2) as depicted at summing block 824.

Turning now to FIGS. 9A-9F, exemplary plots are depicted for a Corvette in a sine-with-dwell steer maneuver at 50 MPH both with and without tire slip angle limiting and stability control enabled according to exemplary embodiments as previously described with reference to FIGS. 7 and 8. In the exemplary plots depicted as FIGS. 9A-9F, the VR command equals zero for simplicity ($\delta_{AFS\_VR}$=0) better highlighting the effects of tire slip angle limiting in combination with stability control.

Figure 9:
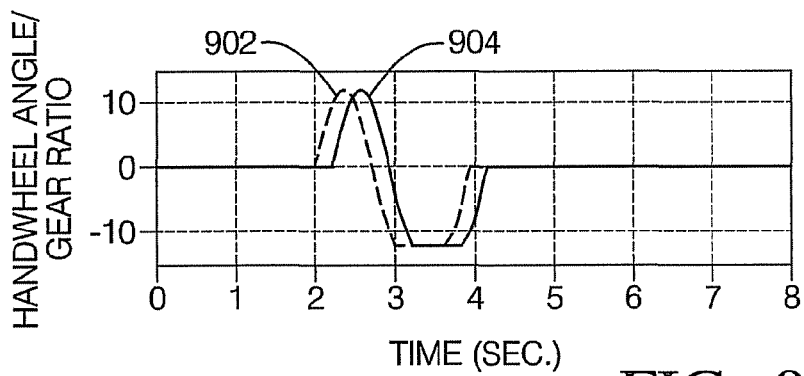
FIGS. 9A-9F are a series of related FIGs. illustrating input and output conditions for an exemplary sine-with-dwell maneuver both with and without tire slip angle limiting and stability control enabled in accordance with the alternative exemplary embodiments depicted in FIGS. 7 and 8.
Figure 9:
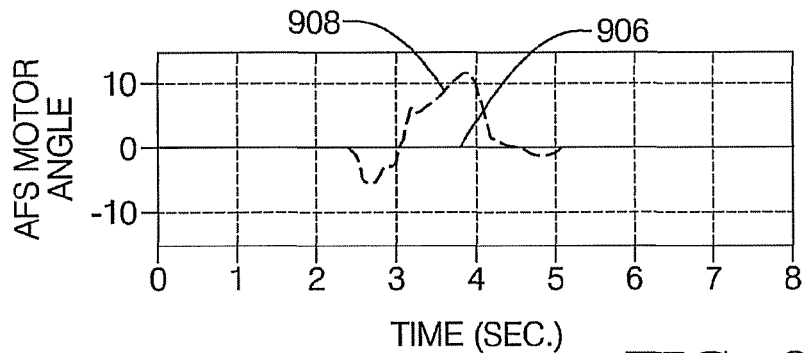
Figure 9:
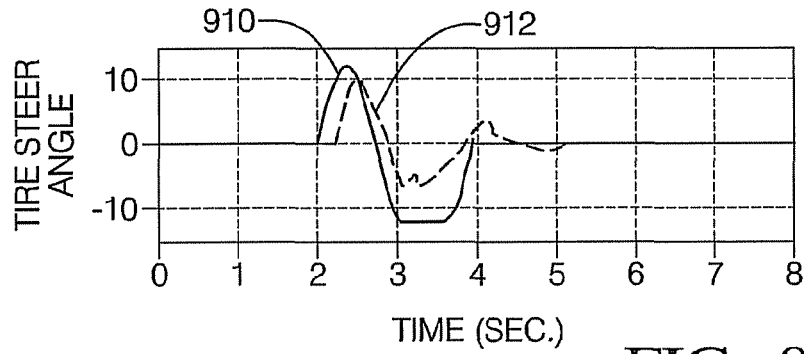
Figure 9:
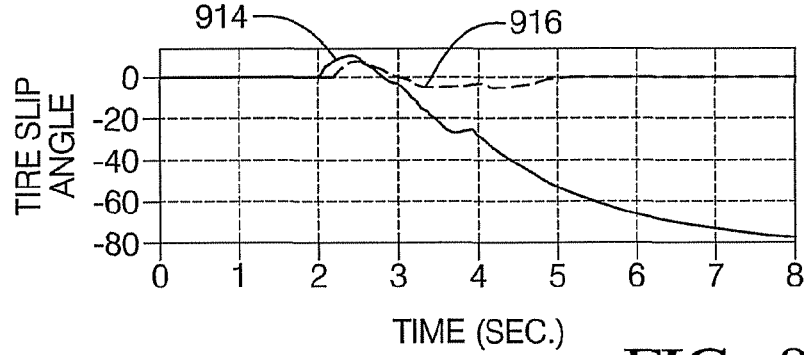
Figure 9:
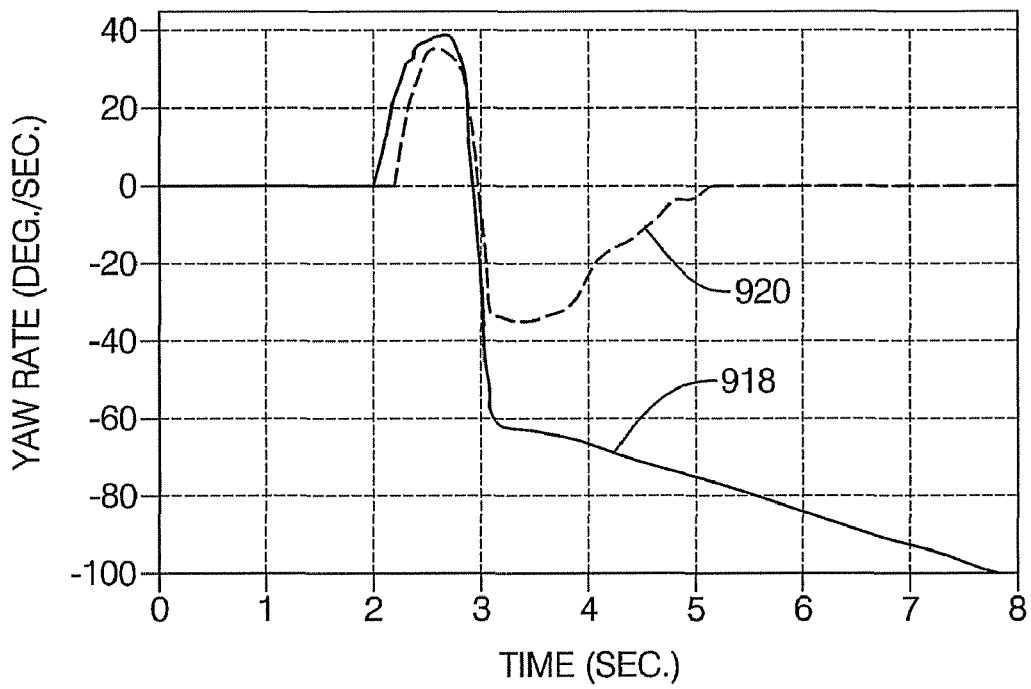
Figure 9:
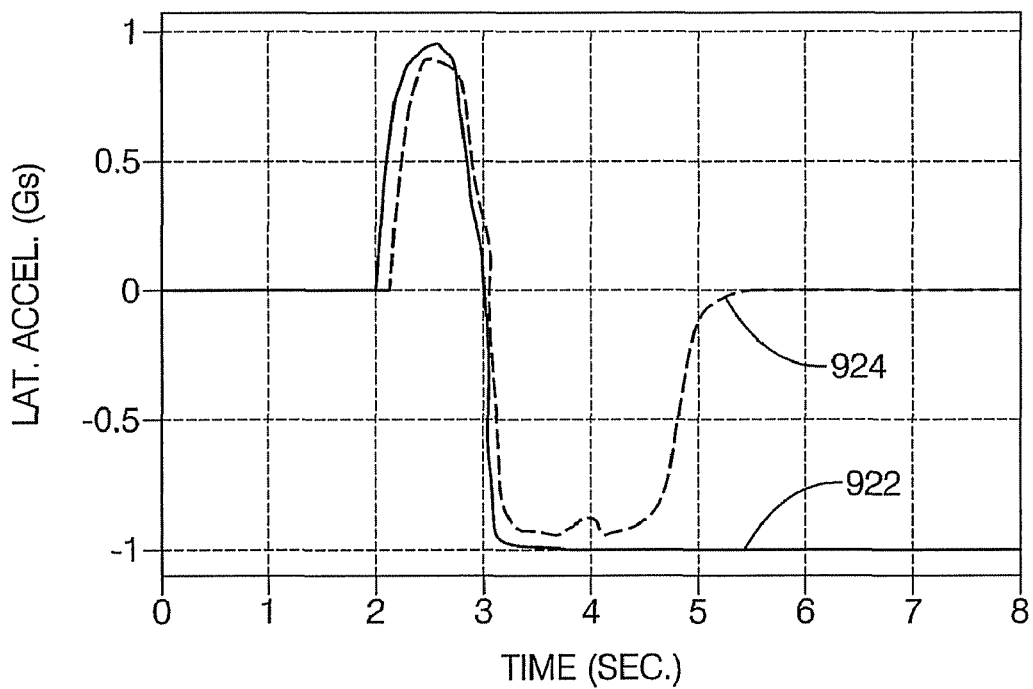

FIG. 9A illustrates the system input as handwheel angle divided by gear ratio versus time. The use of handwheel angle divided by gear ratio on the y-axis normalizes the degrees of handwheel angle movement to the same scale as the AFS motor angle ($\delta_{AFS}$), tire steer angle ($\delta_f$), and tire slip angle ($\alpha_f$). The lines 902 and 904 illustrate that the same sine-with-dwell input is used to establish common conditions for FIGS. 9B-9F, where line 902 has tire slip angle limiting and stability control disabled, and line 904 has tire slip angle limiting and stability control enabled. The lines 902 and 904 shown in FIG. 9A are illustrated with a time shift or differential in order to illustrate separation of the lines 902 and 904. However, it will be understood that the data (handwheel angle/gear ratio) may be generated simultaneously (e.g., at T=2).

FIG. 9B illustrates the AFS motor angle versus time. Line 906 depicts that the AFS motor angle remains at zero when tire slip angle limiting and stability control are disabled. Line 908 shows that the AFS control becomes active in the example, when tire slip angle limiting and stability control are enabled. When the AFS control becomes active, the AFS motor angle ($\delta_{AFS}$) provides counter steer in the example depicted by line 908. The inactivity while tire slip angle limiting and stability control are disabled is also apparent in line 910 of FIG. 9C and line 914 of FIG. 9D. Line 912 of FIG. 9C, tire steer angle versus time, illustrates that the total tire steer angle ($\delta_f$) is limited by the counter steer provided by the AFS motor when tire slip angle limiting and stability control are active and enabled. The effects of tire slip angle limiting and stability control are apparent in that line 910 matches line 902 of FIG. 9A, while line 912 differs from line 904 of FIG. 9A. Thus the tire slip angle ($\alpha_f$) is limited in line 916 of FIG. 6D, tire slip angle versus time, by the AFS motor when tire slip angle limiting and stability control are active and enabled. Line 914 illustrates that the tire slip angle ($\alpha_f$) continues to decrease out of control when tire slip angle limiting and stability control are disabled.

Because of the limiting action when tire slip angle limiting and stability control are active and enabled, the exemplary vehicle 100 is able to maintain stability during the sine-with-dwell maneuver as depicted in FIGS. 9E and 9F. FIG. 9E depicts yaw rate in degrees per second versus time and FIG. 9F depicts lateral acceleration in Gs versus time. Line 920 illustrates that the yaw rate converges back to zero at the end of the maneuver, while line 918 shows a divergent response with tire slip angle limiting and stability control disabled. Similarly, line 924 illustrates that the lateral acceleration converges back to zero when tire slip angle limiting and stability control are enabled and active as compared to line 922, where tire slip angle limiting and stability control are disabled.

Figure 10A:
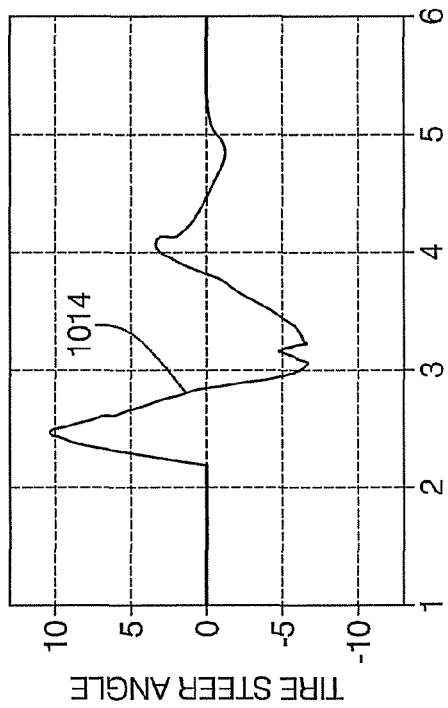
FIGS. 10A-10D are a series of related FIGs. further illustrating input and output conditions for an exemplary sine-with-dwell maneuver as shown in FIGS. 9A-9F with tire slip angle limiting and stability control enabled in accordance with the alternative exemplary embodiments depicted in FIGS. 7 and 8.
Figure 10B:
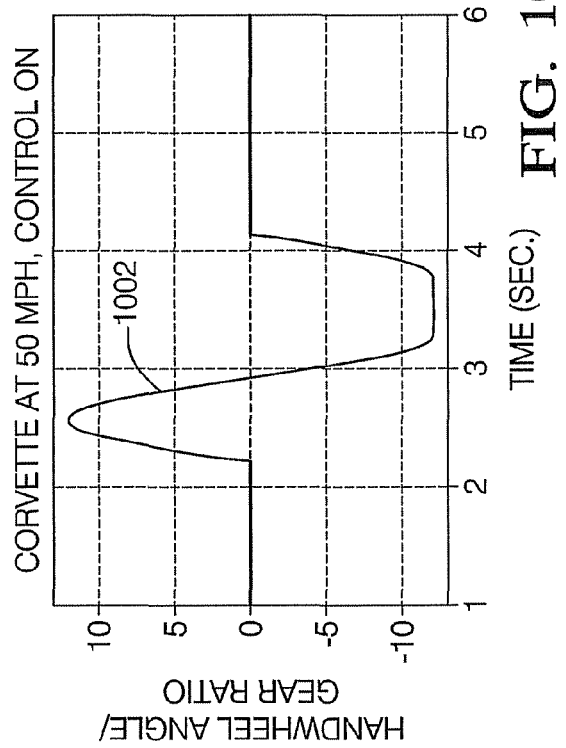
Figure 10C:
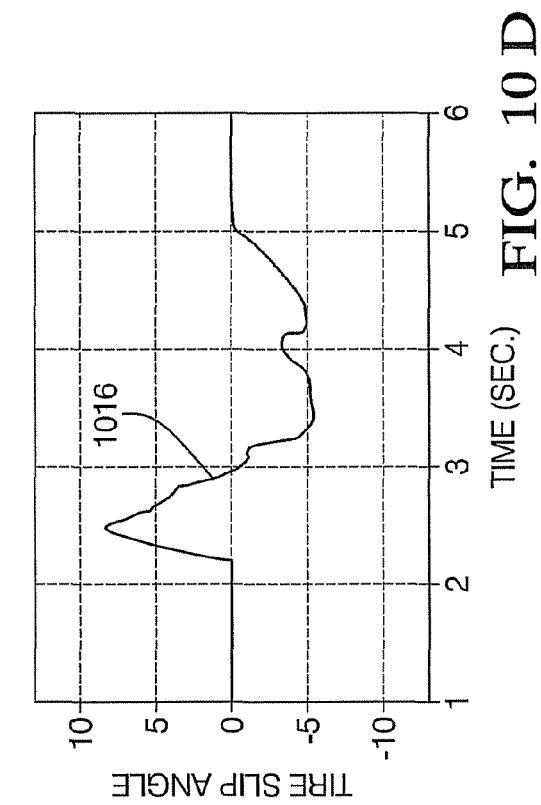
Figure 10D:
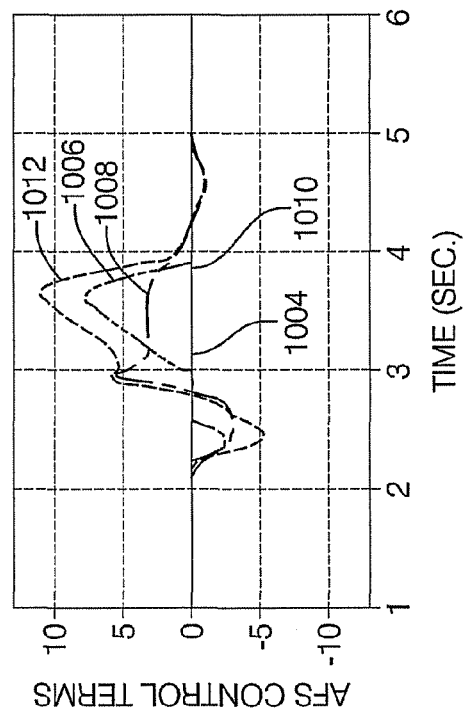

More details of the AFS control operation are shown in FIGS. 10A-10D as a continuation of the exemplary data described in FIG. 9A-9F for the sine-with-dwell maneuver with tire slip angle limiting and stability control enabled. Line 1002 of FIG. 10A is a zoomed in view of line 904 of FIG. 9A. Similarly, line 1014 of FIG. 10C is a zoomed in view of line 912 of FIG. 9C. Line 1016 of FIG. 10D is a zoomed in view of line 916 of FIG. 9D. FIG. 10B illustrates the contributions of the various components of the AFS motor angle command ($\delta_{AFS}$). Line 1004 shows that the VR command is zero ($\delta_{AFS\_VR}$=0) for the example. Line 1006 is the contribution of the first limiting function (LIMIT1). Line 1008 depicts the stability command ($\Delta\alpha_{f\_STABILITY}$) contribution. Line 1010 depicts the contribution of the second limiting function (LIMIT2), which is equal to zero in this case because the stability command ($\Delta\alpha_{f\_STABILITY}$) was not excessive. Line 1012 illustrates the summation of all of the terms as the AFS motor angle command ($\delta_{AFS}$), which is also equivalent to line 908 of FIG. 9B.

As described above, the above-described method can be embodied in the form of computer-implemented software algorithms and apparatuses for practicing those processes. In an exemplary embodiment, the method is embodied in computer program code executed by one or more elements. The present method may be embodied in the form of computer program code containing instructions stored in tangible media, such as floppy diskettes, CD-ROMs, hard drives, flash memory, or any other computer-readable storage medium, wherein, when the computer program code is loaded into and executed by a computer, the computer becomes an apparatus for practicing the invention.

As disclosed, some embodiments of the invention may include some of the following advantages: maximizing the turning capability and responsiveness of a vehicle by holding peak lateral force on steered tires when a driver applies excessive steering; and ensuring that the tires are operating within their linear region for lateral force regardless of handwheel angle or vehicle side slip angle. The tire slip angle limiting method may allow for the optimal use of feedback of vehicle motion (e.g. yaw rate) to adjust the operating point within a linear region of a tire force-slip curve to help stabilize the vehicle more effectively than was previously possible.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for tire slip angle limiting in a steering control system for a vehicle, the method comprising:
    performing on a processor;
        calculating a first steering augmentation angle from a vehicle speed and a handwheel angle;
        calculating an upper bound angle limit and a lower bound angle limit as functions of a vehicle slip angle and a tire slip angle limit;
        bounding the sum of the handwheel angle plus the first steering augmentation angle between the upper bound angle limit and the lower bound angle limit to produce a first bounded angle;
        subtracting the sum of the handwheel angle plus the first steering augmentation angle from the first bounded angle to produce a first limiting function; and
        producing a motor angle command by adding the first limiting function plus the first steering augmentation angle.

2. The method of claim 1, wherein the first steering augmentation angle is calculated as a variable ratio command; and
    wherein the vehicle slip angle is a maximum vehicle slip angle as determined from a lookup table as a function of the vehicle speed.

3. The method of claim 1, wherein the tire slip angle limit is a constant value, the constant value determined from analyzing saturation limits of a force-slip curve.

4. The method of claim 1, wherein the upper bound angle limit is equal to the vehicle slip angle plus the tire slip angle limit, and the lower bound angle limit is equal to the negated value of the upper bound angle limit.

5. The method of claim 1, further comprising:
    determining a second steering augmentation angle;
    bounding the sum of the handwheel angle plus the first steering augmentation angle plus the first limiting function plus the second steering augmentation angle between the upper bound angle limit and the lower bound angle limit to produce a second bounded angle; and
    subtracting the sum of the handwheel angle plus the first steering augmentation angle plus the first limiting function plus the second steering augmentation angle from the second bounded angle to produce a second limiting function;
    wherein producing the motor angle command further includes adding the second steering augmentation angle plus the second limiting function to the sum of the first limiting function plus the first steering augmentation angle.

6. The method of claim 5, wherein tire slip angle limit is a function of a surface friction, the surface friction derived from measured vehicle conditions.

7. The method of claim 5, wherein the vehicle slip angle is derived from measured vehicle conditions.

8. The method of claim 5, wherein the second steering augmentation angle is calculated as a stability command, the stability command calculated in response to vehicle motion derived from measured vehicle conditions.

9. The method of claim 5, wherein the upper bound angle limit is equal to the vehicle slip angle plus the tire slip angle limit, and the lower bound angle limit is equal to the vehicle slip angle minus the tire slip angle limit.

10. A steering control system for a vehicle, the system comprising:
    a controller having a central processing unit,
    a computer program product including instructions for causing the central processing unit to implement a method, the method comprising:
        calculating a first steering augmentation angle from a vehicle speed and a handwheel angle;
        calculating an upper bound angle limit and a lower bound angle limit as functions of a vehicle slip angle and a tire slip angle limit;
        bounding the sum of the handwheel angle plus the first steering augmentation angle between the upper bound angle limit and the lower bound angle limit to produce a first bounded angle;
        subtracting the sum of the handwheel angle plus the first steering augmentation angle from the first bounded angle to produce a first limiting function; and
        producing a motor angle command by adding the first limiting function plus the first steering augmentation angle.

11. The system of claim 10, further comprising:
    a steering actuator motor; and
    wherein the controller including a central processing unit, the central processing unit executing instructions for implementing a method, the method further comprising:
    outputting the motor angle command to the steering actuator motor.

12. The system of claim 10, wherein the upper bound angle limit is equal to the vehicle slip angle plus the tire slip angle limit, and the lower bound angle limit is equal to the negated value of the upper bound angle limit.

13. The system of claim 10, wherein the tire slip angle limit is a constant value, the constant value determined from analyzing saturation limits of a force-slip curve.

14. The system of claim 10, wherein the controller including a central processing unit, the central processing unit executing instructions for implementing a method, the method further comprising:
    determining a second steering augmentation angle;
    bounding the sum of the handwheel angle plus the first steering augmentation angle plus the first limiting function plus the second steering augmentation angle between the upper bound angle limit and the lower bound angle limit to produce a second bounded angle; and
    subtracting the sum of the handwheel angle plus the first steering augmentation angle plus the first limiting function plus the second steering augmentation angle from the second bounded angle to produce a second limiting function;
    wherein producing the motor angle command further includes adding the second steering augmentation angle plus the second limiting function to the sum of the first limiting function plus the first steering augmentation angle.

15. The system of claim 14, wherein tire slip angle limit is a function of a surface friction; and
wherein the upper bound angle limit is equal to the vehicle slip angle plus the tire slip angle limit, and the lower bound angle limit is equal to the vehicle slip angle minus the tire slip angle limit.

16. A computer program product for tire slip angle limiting in a steering control system for a vehicle, the computer program product, comprising:
a computer readable medium encoded with a program, the program including instructions for implementing a method, the method comprising:
calculating a first steering augmentation angle from a vehicle speed and a handwheel angle;
calculating an upper bound angle limit and a lower bound angle limit as functions of a vehicle slip angle and a tire slip angle limit;
bounding the sum of the handwheel angle plus the first steering augmentation angle between the upper bound angle limit and the lower bound angle limit to produce a first bounded angle;
subtracting the sum of the handwheel angle plus the first steering augmentation angle from the first bounded angle to produce a first limiting function; and
producing a motor angle command by adding the first limiting function plus the first steering augmentation angle.

17. The computer program product of claim 16, wherein the upper bound angle limit is equal to the vehicle slip angle plus the tire slip angle limit, and the lower bound angle limit is equal to the negated value of the upper bound angle limit.

18. The computer program product of claim 16, wherein the tire slip angle limit is a constant value, the constant value determined from analyzing saturation limits of a force-slip curve.

19. The computer program product of claim 16, further comprising:
determining a second steering augmentation angle;
bounding the sum of the handwheel angle plus the first steering augmentation angle plus the first limiting function plus the second steering augmentation angle between the upper bound angle limit and the lower bound angle limit to produce a second bounded angle; and
subtracting the sum of the handwheel angle plus the first steering augmentation angle plus the first limiting function plus the second steering augmentation angle from the second bounded angle to produce a second limiting function;
wherein producing the motor angle command further includes adding the second steering augmentation angle plus the second limiting function to the sum of the first limiting function plus the first steering augmentation angle.

20. The computer program product of claim 19, wherein tire slip angle limit is a function of a surface friction; and
wherein the upper bound angle limit is equal to the vehicle slip angle plus the tire slip angle limit, and the lower bound angle limit is equal to the vehicle slip angle minus the tire slip angle limit.

* * * * *